Patented Nov. 21, 1922.

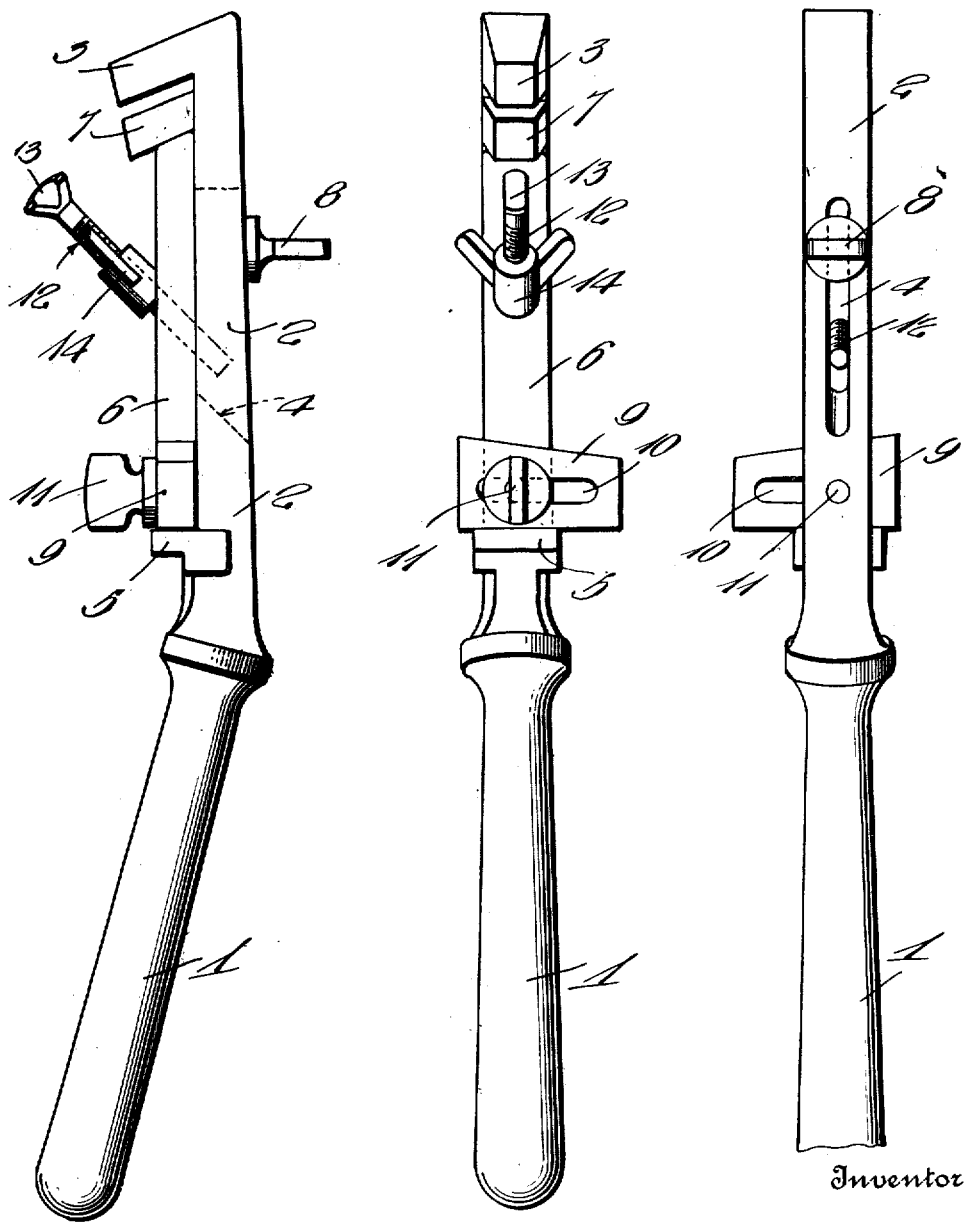

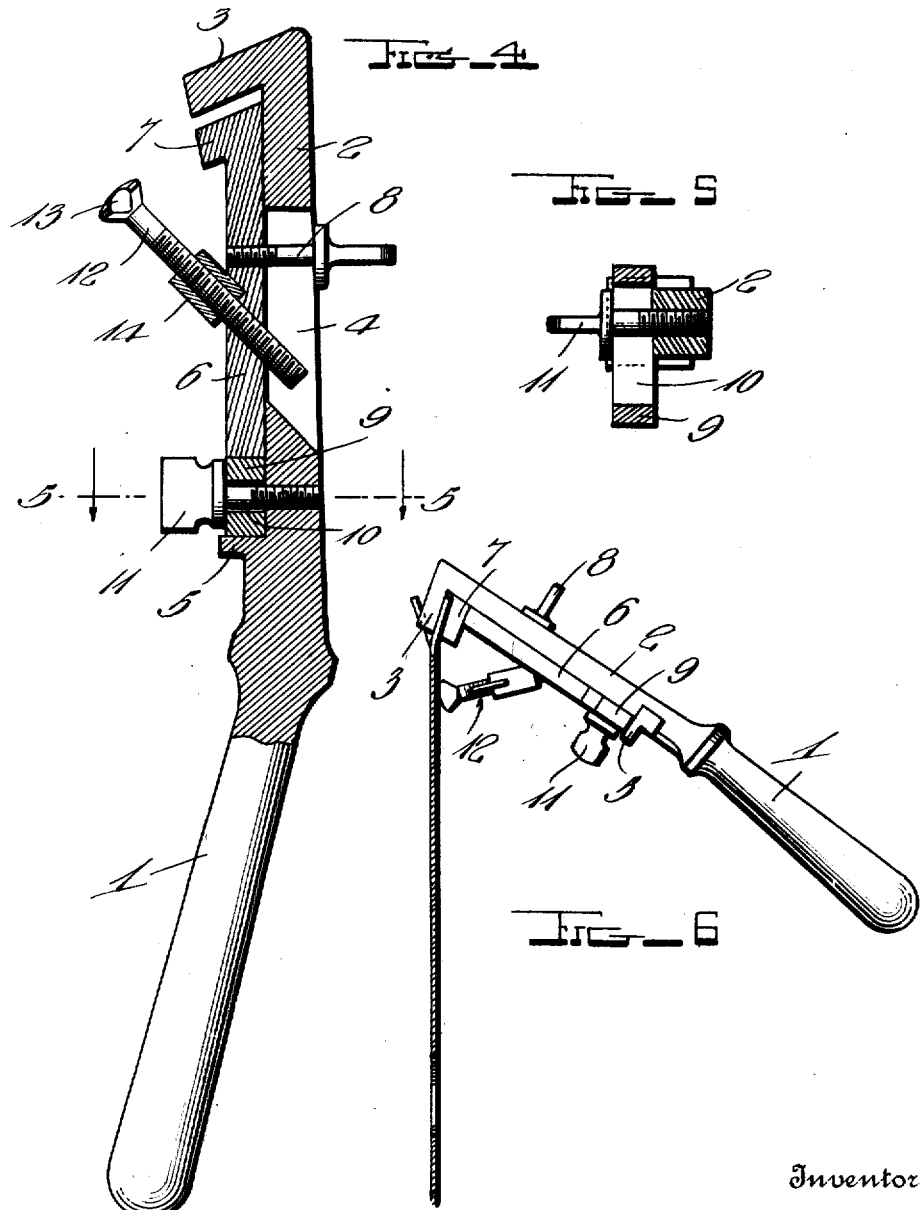

1,436,498

UNITED STATES PATENT OFFICE.

ALFRED GUSTAFSON, OF JUNCTION CITY, KANSAS.

SAW SET.

Application filed August 18, 1921. Serial No. 493,329.

*To all whom it may concern:*

Be it known that I, ALFRED GUSTAFSON, a citizen of the United States, residing at Junction City, in the county of Geary and State of Kansas, have invented certain new and useful Improvements in Saw Sets; and I do declare the following to be a full, clear, and exact description of the invention, such as will enable others skilled in the art to make and use the same.

My invention relates to improvements in saw sets and more particularly to those of the type primarily designed for setting circular saws, while not restricted however to this use.

In carrying out my invention, I employ a handle-carried shank having a fixed jaw at its front end, and a slide carrying a movable jaw is shiftable along this shank so as to bring the two jaws in operative relation with each other, regardless of the thickness of the saw teeth. One object of the invention is to provide the slide with an adjustable stop adapted to strike one side of the saw to limit the movement of the tool and consequently control the angle at which the saw teeth are set.

In mounting the slide upon the shank, the latter is formed with a longitudinal slot through which a clamping screw passes for holding said slide in adjusted position, and a further aim of the invention is to construct the above mentioned stop in such a way that one end thereof extends into said slot, so as to prevent pivotal action of the slide about the clamping screw.

Yet another object is to provide a novel means for receiving the rearward thrust of the slide, during the action of setting the saw teeth.

With the foregoing in view, the invention resides in the novel subject matter hereinafter described and claimed, the descriptive matter being supplemented by the accompanying drawings.

Figure 1 is a side elevation of a saw set constructed in accordance with my invention.

Figures 2 and 3 are edge views.

Figure 4 is a central longitudinal sectional view.

Figure 5 is a detail transverse sectional view as indicated by line 5—5 of Fig. 4.

Figure 6 is a small side elevation of the tool showing its manner of use.

In the drawings above briefly described, the numeral 1 designates an appropriate handle provided with a rigid forwardly extending shank 2, the front end of said shank being provided with a laterally extending fixed jaw 3 which is preferably arranged obliquely as shown. The shank 2 is provided with a longitudinal slot 4 and in rear of this slot, one side of said shank is equipped with a fixed shoulder 5. An elongated slide 6 contacts with the shoulder 5 of the shank 2 and is provided at its front end with a jaw 7 parallel with the jaw 3 and adapted for coaction therewith in gripping the saw teeth as shown in Fig. 6. A clamping screw 8 passes through the slot 4 and is threaded in the slide 6 for frictionally binding the latter after it is adjusted according to the thickness of the saw teeth but in addition to this clamping means, I prefer to use a wedge 9 interposed between the shoulder 5 and the rear end of the slide 6, for the purpose of receiving the thrust of said slide. The wedge 9 extends transversely of the shank 2 and is provided with a slot 10 through which a screw 11 passes to clamp the wedge against movement when it is properly set.

The jaws 3 and 7 are engaged with the saw teeth in the manner shown in Fig. 6 and the handle 1 is then moved toward the jaw, with the result that the teeth are bent to the required extent, and in order that all of the teeth may be uniformly set, I provide a stop pin 12, which is threaded diagonally through the slide 6, the front end of said pin being adapted to strike the saw as shown in Fig. 6, while the rear end of the pin is received in the slot 4 and thereby prevents pivotal movement of the slide 6 about the clamping screw 8, when the latter is loosened and the slide is being adjusted.

I have described the pin 12 as threaded through the slide 6, but it will be understood that it might otherwise pass adjustably through this slide. When the threaded formation is used, the front end of the pin is preferably provided with a flat-sided head 13 so that it may be readily turned for making the necessary adjustments and a winged lug nut 14 is threaded on said pin to bear against the slide and hold the former in adjusted position.

From the foregoing, taken in connection with the accompanying drawing, it will be seen that while my invention is extremely simple and inexpensive, it will be highly efficient and in every way desirable. Since excellent results have been obtained from the details shown herein, these details are preferably followed. It is to be understood however that within the scope of the invention as claimed, numerous minor changes may be made.

I claim:

1. A saw setting tool comprising a handle having a forwardly extending rigid shank whose front end is provided with a fixed laterally extending tooth-engaging jaw, a slide adjustable along said shank toward and from said fixed jaw, said slide having a jaw for coaction with said fixed jaw in setting the teeth when the handle is moved toward the saw, and an adjustable stop extending from said slide in position to strike the saw and limit the movement of the tool, said stop also serving to prevent pivotal movement of said slide.

2. A saw setting tool comprising a handle having a forwardly extending rigid shank whose front end is provided with a fixed laterally extending tooth-engaging jaw, said shank having a longitudinal slot, a slide in contact with said shank and having a jaw cooperable with said fixed jaw, a clamping screw passing through said slot for holding said slide in adjusted position, and a stop pin extending adjustably through said slide, one end of said pin being adapted to strike the saw to limit the movement of the tool, the other end of said pin extending into said slot to prevent pivotal movement of said slide on said clamping screw.

3. A saw setting tool comprising a handle having a forwardly extending rigid shank whose front end is provided with a fixed laterally extending tooth-engaging jaw, said shank having a shoulder spaced in rear of said jaw, a slide adjustably mounted on said shank and having a jaw for coaction with the fixed jaw, a wedge movable transversely of the shank and interposed between said shoulder and said slide to hold the latter in adjusted position, and means for holding said wedge after setting thereof.

In testimony whereof I have hereunto set my hand.

ALFRED GUSTAFSON.